United States Patent
Downie (10) Patent No.: US 7,168,445 B2
(45) Date of Patent: Jan. 30, 2007

(54) INTRA-CYLINDER TUBULAR PRESSURE REGULATOR

(75) Inventor: Neil Alexander Downie, Guildford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/209,104

(22) Filed: Aug. 22, 2005

(65) Prior Publication Data

US 2005/0274422 A1 Dec. 15, 2005

Related U.S. Application Data

(62) Division of application No. 10/439,565, filed on May 16, 2003.

(51) Int. Cl.
*G05D 16/06* (2006.01)
(52) U.S. Cl. .................... 137/505.35; 137/614
(58) Field of Classification Search .......... 137/592, 137/505.41, 505.46, 613, 505, 505.47, 505.35, 137/505.36, 614; 222/3
See application file for complete search history.

(56) References Cited

U.S. PATENT DOCUMENTS

| | | | |
|---|---|---|---|
| 85,565 A | | 1/1869 | Corliss |
| 1,958,878 A | | 5/1934 | Albersheim |
| 3,393,701 A | | 7/1968 | Brown |
| 3,747,600 A | | 7/1973 | Andersson |
| 4,877,048 A | * | 10/1989 | Oltean et al. ............... 137/225 |
| 4,971,108 A | | 11/1990 | Gottlieb |
| 5,010,882 A | * | 4/1991 | Polyak et al. ............... 600/40 |
| 5,197,710 A | * | 3/1993 | Wass et al. ............ 251/129.15 |
| 5,303,734 A | * | 4/1994 | Eidsmore ................ 137/505.43 |
| 5,694,975 A | | 12/1997 | Eidsmore |
| 5,950,652 A | * | 9/1999 | Morgan ...................... 137/14 |

(Continued)

FOREIGN PATENT DOCUMENTS

EP 0 512 553 11/1992

(Continued)

OTHER PUBLICATIONS

Search Report from British Patent Office regarding UK App 0211410.6.

(Continued)

*Primary Examiner*—Stephen M. Hepperle
(74) *Attorney, Agent, or Firm*—McAndrews, Held & Malloy, Ltd.

(57) ABSTRACT

A fluid control system for use with toxic or corrosive gases (for example) has been provided that includes a fluid pressure regulator comprising a fluid inlet; a fluid outlet; a first fluid flow path between the fluid inlet and the fluid outlet; a valve seat positioned in the first fluid flow path and dividing the fluid inlet and the fluid outlet; a valve element regulating flow through the valve seat; a generally cylindrical membrane defining an inflatable fluid cavity that moves axially, responsive to inflation; a wall portion of the cavity that moves responsive to inflation and deflation of the cavity; a second fluid flow path communicating between the cavity and a source of pressure outside the cavity; and a link transmitting the movement of the wall portion to the valve element, thereby moving the valve element with respect to the valve seat responsive to inflation and deflation of the cavity.

9 Claims, 5 Drawing Sheets

U.S. PATENT DOCUMENTS

| | | |
|---|---|---|
| 6,089,027 A | 7/2000 | Wang et al. |
| 6,101,816 A | 8/2000 | Wang et al. |
| 6,257,000 B1 | 7/2001 | Wang |
| 6,360,546 B1 | 3/2002 | Wang |
| 6,452,099 B1 * | 9/2002 | Miller et al. .............. 174/65 G |
| 2002/0014227 A1 | 2/2002 | Girouard |
| 2003/0226588 A1 | 12/2003 | Olander |

FOREIGN PATENT DOCUMENTS

| | | |
|---|---|---|
| EP | 0 916 891 | 5/1999 |
| EP | 1 180 638 | 2/2002 |
| WO | 00/67089 | 11/2000 |
| WO | WO 00/67089 | 11/2000 |

OTHER PUBLICATIONS

European Search Report for EP 03 25 2905, mailed Feb. 22, 2006.
European Search Report for EP 03 25 2905, mailed Jan. 2, 2006.

* cited by examiner

INTRA-CYLINDER TUBULAR PRESSURE REGULATOR

RELATED APPLICATIONS

This application is a division of U.S. application Ser. No. 10/439,565, entitled "Intra-Cylinder Tubular Pressure Regulator," filed May 16, 2003, which claims priority benefits of United Kingdom Patent Application No. 0211410.6, filed May 17, 2002, entitled "Intra-Cylinder Tubular Pressure Regulator," both of which are hereby expressly incorporated herein in their entireties including the specification, claims, drawings and abstract.

BACKGROUND OF THE INVENTION

The present invention generally relates to improvements in a fluid pressure regulator, and more particularly relates to an improved fluid pressure regulator used within a fluid control system.

Pressurized fluid containers, such as gas containers or cylinders, have been used for many applications. For example, cylinders storing high-pressure hydrides have been used in semiconductor manufacturing processes. Typically, the high-pressure fluid, such as a gas, stored in fluid cylinders is not dispensed at high pressure. Rather, a pressure regulator or other flow restriction device used in conjunction with a cylinder typically delivers, or dispenses, the fluid from the cylinder at a pressure substantially lower than that inside the cylinder. Typically, a self-regulating mechanical device, or pressure regulator, is used to reduce the pressure of a dispensed gas. Most, if not all, pressure regulators incorporate a diaphragm or a piston connected to a valve as a way of reducing the pressure of the dispensed gas.

Typically, a pressure regulator is discrete from the fluid cylinder and from the valve that selectively controls the dispensing of the gas from the cylinder. Gas under high pressure, however, may escape at a dangerously high rate from a fluid cylinder if the cylinder valve is inadvertently opened. To minimize the risks associated with gas leaks, some gas dispensing systems have included pressure reduction devices, such as a restrictive flow orifice or an integrated valve, as part of the cylinder assembly. An integrated valve typically includes a low-pressure shut-off valve and a pressure regulator within the same fluid dispensing assembly.

A pressure regulator may be set to reduce the pressure of a gas to subatmospheric pressure, i.e., less than 1 bar absolute pressure. A fluid dispensing, or fluid control, system utilizing a subatmospheric pressure regulator offers a safety advantage. That is, gas is not dispensed from the system, even if the cylinder valve is opened, unless the pressure on the downstream side of the pressure regulator is lower than atmospheric pressure. In other words, gas is dispensed from the system only when a downstream device or condition draws the gas from a fluid outlet of the dispensing assembly, i.e., by drawing a vacuum. The method of actively extracting gas from a dispensing assembly of a gas dispensing system is used in, for example, self-contained underwater breathing apparatus ("SCUBA") and in systems designed to supply hazardous toxic gases to semiconductor manufacturing systems.

Positioning an integrated valve substantially or entirely within a fluid cylinder protects the pressure regulator of the integrated valve from external forces and damage associated with moving the cylinder. Further, installing an integrated valve within a fluid cylinder makes the gas dispensing system more compact and easier to handle.

U.S. Pat. No. 6,101,816 issued to Wang et al. ("Wang I") (assigned to Advanced Technology Materials, Inc), granted Aug. 15, 2000, teaches a fluid pressure regulator positioned within a fluid cylinder. The invention described in Wang I, however, includes a pressure regulator located upstream from any valves included within the system. Fluid contained in the fluid cylinder or vessel flows through the pressure regulator before flowing through any valve or through any other flow control element within the system. Wang I, however, does not disclose the size of the opening of the cylinder or vessel used with the invention. Pressure regulators conventionally used with toxic gases, however, do not easily fit inside standard fluid cylinders. Typically, standard fluid cylinders include an opening of ¾ inch NGT (National Gas Taper), which is approximately 23 mm in diameter. However, the smallest gas pressure regulators commercially available for use with such applications are approximately 40 mm in diameter.

U.S. Pat. No. 6,089,027, also issued to Wang et al, ("Wang II") (also assigned to Advanced Technology Materials, Inc.) and granted Jul. 18, 2000, also teaches a fluid pressure regulator disposed within a fluid cylinder or vessel. Wang II states at column 4, lines 55–59, "In order to usefully exploit the Wang et al. system of the parent application [Wang I], embodying a 'regulator in a bottle' approach, larger cylinder inlets are required than are conventionally available." Further, at column 5, lines 3–11, Wang II states, "In order to commercially enable the Wang et al. 'regulator in a bottle' approach of the parent patent application, it is necessary to provide a cylinder that satisfies United States Department of Transportation (USDOT) packaging standards, has a larger inlet opening than is conventionally available, and can withstand pressures in the range of from about 1000 to about 5000 pounds per square inch (psi). No such vessel has been proposed or fabricated by the prior art, and none is commercially available." Thus, while Wang I does not specify the size of the opening of the cylinder or vessel, Wang II clarifies that the invention described in Wang I cannot be used with standard fluid cylinders. Further, Wang II teaches a cylinder having an inlet opening of greater than 1 inch NGT.

As compared to standard fluid cylinders having a ¾ inch NGT opening, fluid cylinders having an opening greater than the standard ¾ inch NGT, such as those used with Wang I and Wang II, are more prone to leaks, are heavier, and are more expensive to manufacture. The cylinder openings of standard fluid cylinders are, for reasons of weight, containment integrity and manufacturing cost, made as small as possible. Further, a large number of standard fluid cylinders already exist. The regulators described in Wang I and Wang II, however, cannot be used with these standard cylinders.

European Patent Application 0 512 553 A1 ("MEVA application"), published Nov. 11, 1992 is directed to a superatmospheric pressure controlled reducing valve. The MEVA application, at column 2, lines 56 to Col. 3, lines 1–2 states, "The valve designed for being used in respirators adapted to operate exclusively in the superatmospheric pressure breathing regime is controlled by a straight stay or stays immediately confining a space or cavity." The MEVA application shows a valve that is pulled against a fluid inlet through the bending of stays. However, the MEVA application does not teach or suggest the use of the superatmospheric pressure controlled reducing valve with a semiconductor manufacturing system, or with toxic gases. Rather, as discussed in the MEVA abstract and at Col. 2, lines 56 to Col. 3, lines 1–2, the reducing valve described in the MEVA application is used "exclusively in the superatmospheric pressure breathing regime." Further the MEVA application does not teach or suggest positioning, or interiorly disposing, the superatmospheric pressure controlled reducing valve within a fluid cylinder.

Thus a need exists for a system and method of efficiently and inexpensively protecting a fluid pressure regulator that is used with a standard fluid cylinder having an opening of ¾ inch NGT. Further, a need exists for a system and method of protecting a fluid pressure regulator that is used with a standard fluid cylinder that stores toxic gases, such as hydrides used in the semiconductor manufacturing industry.

SUMMARY OF THE INVENTION

In accordance with at least one embodiment of the present invention, a fluid pressure regulator has been developed that includes a fluid inlet, a fluid outlet, a first fluid flow path between the fluid inlet and the fluid outlet, a valve seat positioned in the first fluid flow path and dividing the fluid inlet and the fluid outlet, a valve element regulating flow through the valve seat, and a generally cylindrical membrane defining an inflatable fluid cavity that includes a wall portion that moves responsive to inflation and deflation of the cavity, a second fluid flow path communicating between the cavity and a source of pressure outside the cavity, and a link transmitting the movement of the wall portion to the valve element, thereby moving the valve element with respect to the valve seat responsive to inflation and deflation of the cavity. The valve element regulating flow between the fluid inlet and the fluid outlet may be a poppet comprising a valve disk and a valve stem, in which case, the valve stem can define the link.

In certain embodiments of the present invention, the fluid pressure regulator further comprises at least one radially flexible stiffening member extending generally axially along the membrane and having a first portion, a second portion spaced axially from the first portion, and a third portion between the first and second portions. The third portion is positioned to contact and be flexed by the membrane when the membrane moves radially. The first portion of the stiffening member is secured with respect to a first end cap and the second portion of the stiffening member is secured with respect to a second end cap.

Certain embodiments of the present invention utilize the fluid pressure regulator within a fluid control system for dispensing high-pressure fluid at reduced pressure. The fluid control system comprises a container for storage and dispensing of a fluid and a fluid flow control device connected to the outlet of the container. The fluid flow control device comprises at least a first fluid flow path having a main fluid inlet in fluid communication with the container and a main fluid outlet, and a high-pressure shut-off valve in the first fluid flow path to selectively open or close the fluid flow path. The fluid pressure regulator is positioned in the first fluid flow path for providing fluid at the main fluid outlet at a selected pressure. The fluid pressure regulator is downstream of the high-pressure shut-off valve and located inside the container.

BRIEF DESCRIPTION OF SEVERAL VIEWS OF THE DRAWINGS

The foregoing summary, as well as the following detailed description of certain embodiments of the present invention, will be better understood when read in conjunction with the appended drawings. For the purpose of illustrating the invention, there are shown in the drawings certain embodiments that illustrate the invention. It should be understood, however, that the present invention is not limited to the arrangements and instrumentalities shown in the attached drawings.

Like reference characters on the several drawing figures indicate like or similar parts.

DETAILED DESCRIPTION OF THE INVENTION

Figure 1:
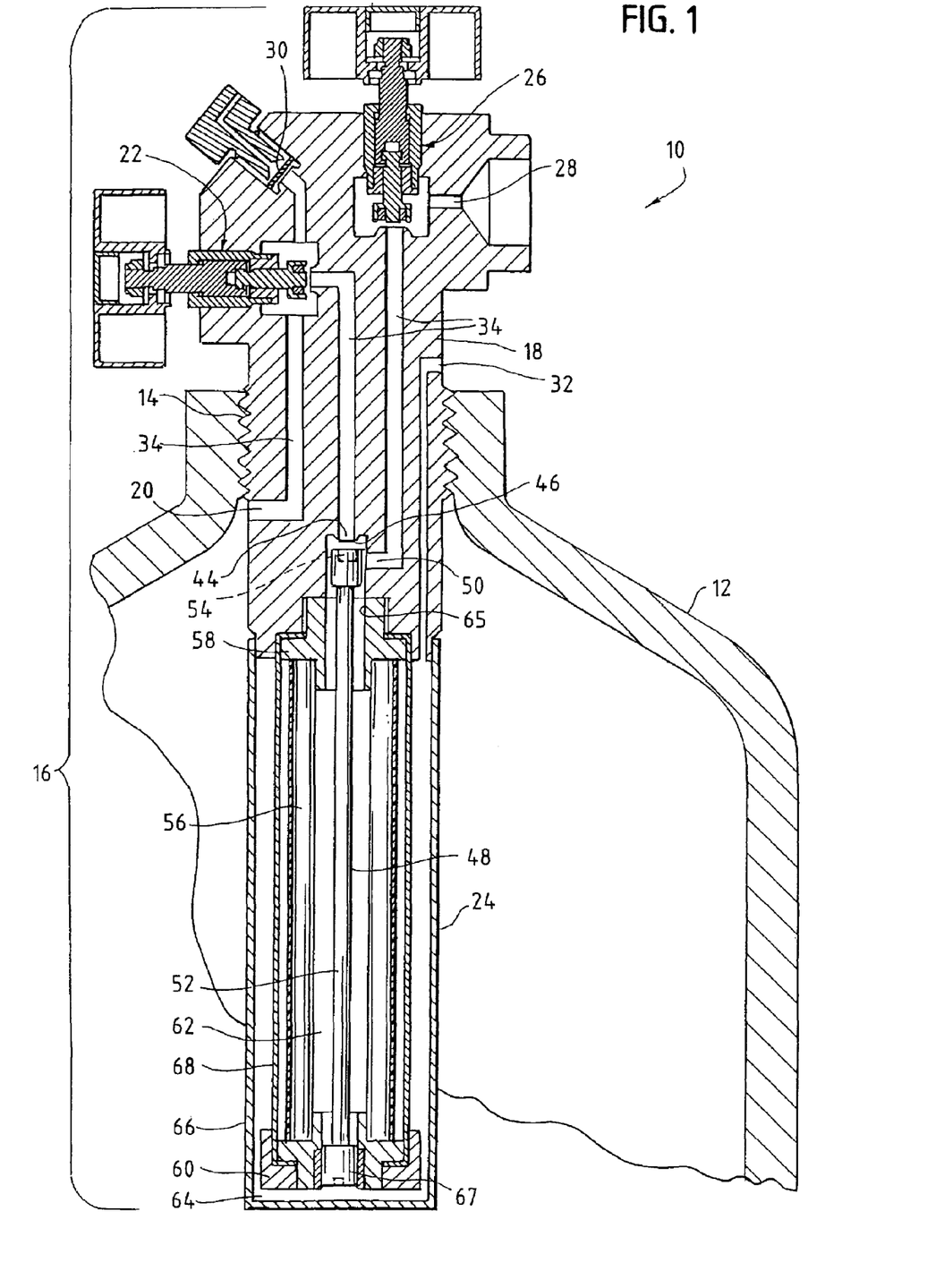
FIG. 1 is a partial axial section of a fluid control system according to an embodiment of the present invention.

FIG. 1 shows a fluid control system 10 according to an embodiment of the present invention. The system 10 includes a pressurized fluid container or cylinder 12 having an outlet port 14 and a fluid flow control device, such as an integrated valve assembly 16. The integrated valve assembly 16 includes a main body 18, a main fluid inlet 20, a high-pressure shut-off valve 22, a pressure regulator 24, a low-pressure shut-off valve 26, a main fluid outlet 28, a bursting disc safety member 30 and a vent 32.

A fluid flow path 34 progresses from the main fluid inlet 20 to the high-pressure shut-off valve 22, then from the valve 22 to the pressure regulator 24. The fluid flow path 34 continues from the pressure regulator 24 to the low-pressure shut-off valve 26 and through the main fluid outlet 28. The high-pressure shut-off valve 22 regulates flow of the fluid in the fluid flow path 34 between the inlet 20 and the regulator 24. The pressure regulator 24 regulates flow of the fluid in the fluid flow path 34 between the high-pressure shut-off valve 22 and the low-pressure shut-off valve 26. The low-pressure shut-off valve 26, in turn, regulates flow and delivers the fluid at a predetermined pressure through the fluid flow path 34 between the regulator 24 and the main fluid outlet 28.

The integrated valve assembly 16 is affixed to the outlet port 14 of the cylinder 12 in a conventional manner, such as by providing mating threads on the exterior of the integrated valve assembly 16 and on the interior of the outlet port 14. Alternatively, the integrated valve assembly 16 may be welded into the outlet port 14.

In operation, fluid flows from the interior of the cylinder 12 and enters the fluid flow path 34 through the main fluid inlet 20. The fluid then travels from the main fluid inlet 20 through the fluid flow path 34 to the high-pressure shut-off valve 22. After flowing through the high-pressure shut-off valve 22 (when the high-pressure shut-off valve 22 is opened), the fluid travels along the fluid flow path 34 to the pressure regulator 24. The fluid then travels through the pressure regulator 24. After passing through the pressure regulator 24, the fluid travels along the fluid flow path 34 and encounters the low-pressure shut-off valve 26. When the low-pressure shut-off valve 26 is opened, the fluid then passes from the system 10 at the main fluid outlet 28.

Figure 2:
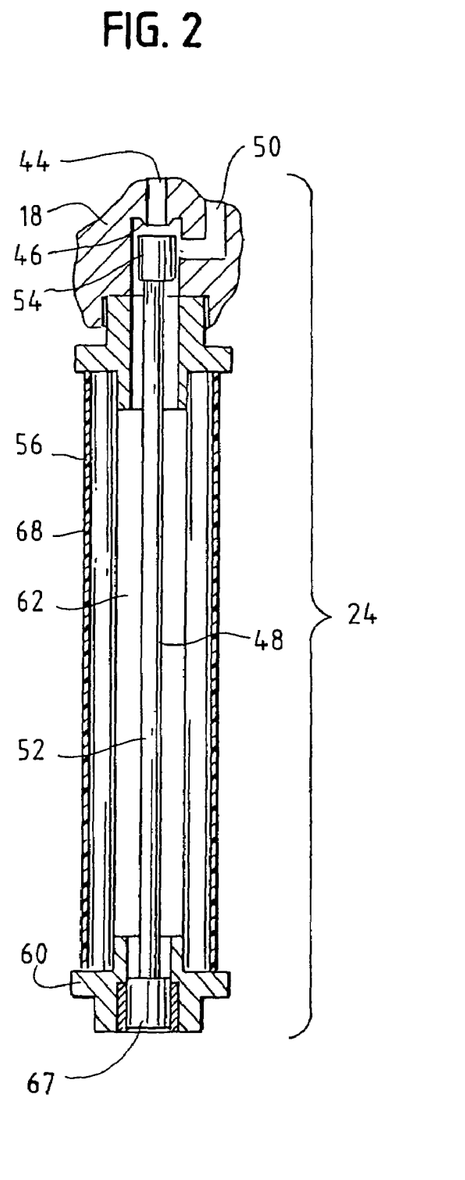
FIG. 2 is an axial section showing the tubular pressure regulator of FIG. 1 in isolation.
Figure 3:
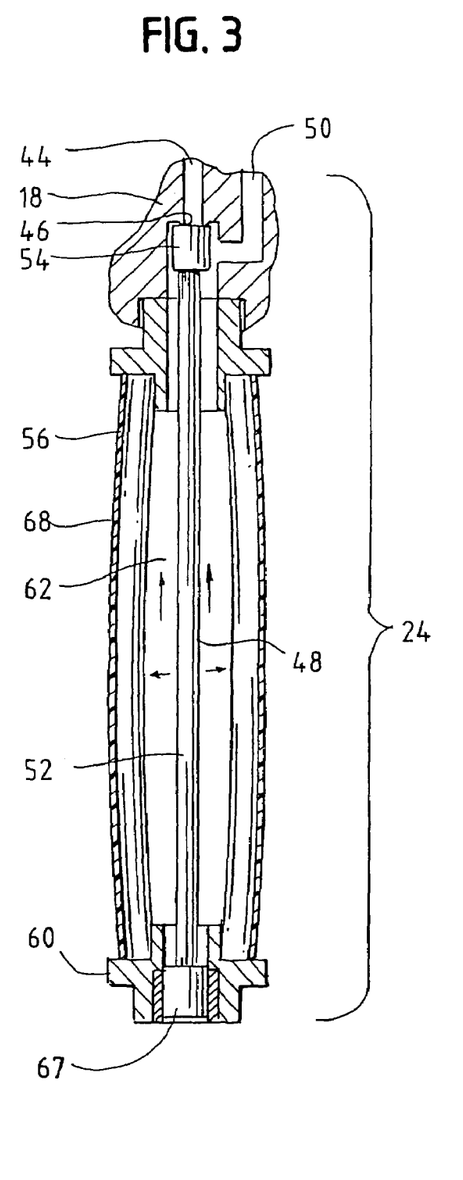
FIG. 3 is an axial section similar to FIG. 2, but showing the regulator chamber inflated.

Referring now to FIGS. 1–3, the pressure regulator 24 includes a regulator inlet 44, a valve seat 46 dividing the regulator 24 into a high pressure side in the inlet 44 and a low-pressure side downstream of the valve seat 46, a poppet 48 movably positioned to seat on the valve seat 46, and a regulator outlet 50 communicating with the low-pressure side of the valve seat 46. The poppet 48 includes a valve stem 52 and a valve head or disk 54 located at one end of the valve stem 52, adjacent to the seat 46.

A cylindrical expandable membrane 56 is an inflatable tubular diaphragm secured by a fixed inlet end 58 to the main body 18 of the integrated valve assembly 16, and capped at the other end by a movable plate 60. The cylindrical expandable membrane 56 separates an inner fluid cavity 62 from an outer fluid cavity 64. The membrane 56 is radially inflatable or deflatable responsive to pressure differences between the inner fluid cavity 62 and the outer fluid cavity 64. (shown inflated in FIG. 3, and otherwise shown deflated). The inner fluid cavity 62 communicates with the low-pressure outlet 50 of the regulator 24 via a second fluid flow path 65. The outer fluid cavity 64 is further defined by a substantially rigid housing 66 connected to and supported by the main body 18 of the integrated valve 16. The housing 66 isolates the interior of the regulator 24 from the pressure inside the cylinder 12. In this embodiment, the outer fluid cavity 64 is vented to the atmosphere through the vent 32 to define a reference pressure.

The expandable membrane 56 may be fabricated from any of a variety of materials, such as elastomeric film. In this embodiment, the membrane 56 is stiffened by radially flexible, axially relatively inflexible stiffening members 68 extending axially between and connected at their respective ends to the main body 18 of the integrated valve assembly 16 and the movable plate 60.

The regulator 24 regulates pressure at its outlet 50 as follows. The cylindrical expandable membrane 56 moves the valve stem 48 responsive to the pressure on the low-pressure side of the valve seat 46 to maintain the low-pressure side at a desired setpoint pressure.

A pressure increase in the inner fluid cavity 62 (and thus at the regulator outlet 50) approaching its setpoint, relative to the atmospheric reference provided by the outer fluid cavity 64, inflates the membrane 56 radially outward, particularly between its end plates 58 and 60, as shown in FIG. 3. Outward inflation flexes the centers of the stiffening members 68 radially outward. Bending the stiffening members 68 outward at the center draws their ends toward each other and lifts the movable plate 60. Upward motion of the plate 60 is transmitted by the valve stem 52 to the valve disk 54, which moves toward and (if the inflation pressure is at its setpoint) bears against the seat 46. Seating the valve disk 54 stops the flow of high-pressure fluid from the regulator inlet into the inner fluid cavity 62, responsive to elevated pressure in the low-pressure side of the regulator 24. The pressure at which inflation of the membrane 56 seats the valve disk 54 on the valve seat 46 is the setpoint of the regulator, and defines the highest pressure the regulator will allow at the low-pressure outlet 50. The setpoint may be adjustable by a set point adjusting member 67, such as a screw or other such adjustment means, which moves the valve stem 52, thereby changing the distance between the valve disk 54 and the valve seat 46. Such an adjustment means is preferably lockable at any desired position.

When the pressure in the inner fluid cavity 62 drops below the setpoint, due to flow through the outlet 50 with the valve disk 54 seated, the membrane 56 deflates to a degree, causing the stiffening members 68 to straighten, the movable plate 60 to drop (in the orientation of the Figures), the stem 52 to move downward, and thus the valve disk 54 to unseat. Unseating the valve allows the membrane 56 to inflate once again, until its setpoint is again reached and the valve closes again. This continual inflation and deflation of the membrane 56, as the pressure in the inner fluid cavity 62 varies, maintains the pressure delivered to the outlet 50 substantially at the setpoint value, providing a higher pressure is delivered to the regulator inlet 44.

The membrane 56 optionally is generally cylindrical, as in the illustrated embodiments, and can be elongated as necessary to increase its valve seating force, generated in response to a given pressure difference between the inner and outer cavities 62 and 64, without increasing its radial dimensions. Thus, one advantage of this configuration is that the pressure regulator 24 can be slender enough to be positioned inside the cylinder 12. The tubular, slender shape of the pressure regulator 24 allows it to safely pass through the outlet port 14 of the cylinder 12. For example, the cylinder 12 can be a standard fluid cylinder wherein the outlet port 14 is ¾ inch NGT (National Gas Taper). The placement of the pressure regulator 24 inside the cylinder 12 protects the pressure regulator 24 from damage by external forces, stresses and strains. Alternatively, however, the outlet port 14 of the cylinder 12 may be any size that is suitable for passage of the pressure regulator 24 into the cylinder 12.

The bursting disc safety member 30 is a thin, circular diaphragm made of corrosion-proof metal. The bursting disc safety member 30 is intended to break at a defined pressure. The main body 18 supports the high-pressure shut-off valve 22, the low-pressure shut-off valve 26 and the pressure regulator 24.

The fluid flow path 34 may provide a fill path for the cylinder 12. For example, liquefied gas at a low pressure, which may be below the setpoint of the regulator, may be filled via fluid flow path 34. Alternatively, a separate fluid fill inlet and fluid fill path may be formed within the cylinder 12. A fluid fill valve may also be positioned within the fluid fill path.

Alternatively, the pressure regulator 24, the high-pressure shut-off valve 22 and the low-pressure shut-off valve 26 may be discrete devices not included in a common integrated valve assembly 16. Also, the system 10 does not require the bursting disc safety member 30. Additionally, the system 10 does not necessarily require the stiffening members 68. Also, the system 10 does not require the rigid housing 66. The present invention can include an expandable membrane 56 that can expand without a rigid housing 66 limiting the degree of expansion.

The stiffening members 68 may be flexible metal or plastic strips or plates. Alternatively, the stiffening members 68 may comprise a diaphragm that is stiffer than the expandable membrane 56, and which encompasses the more expandable membrane 56. The stiffening members 68 and the expandable membrane 56, both of which are connected to the movable plate 60, pull the movable plate 60 toward the main body 18 as the stiffening members 68 bow out and the membrane 56 inflates.

Figure 4:
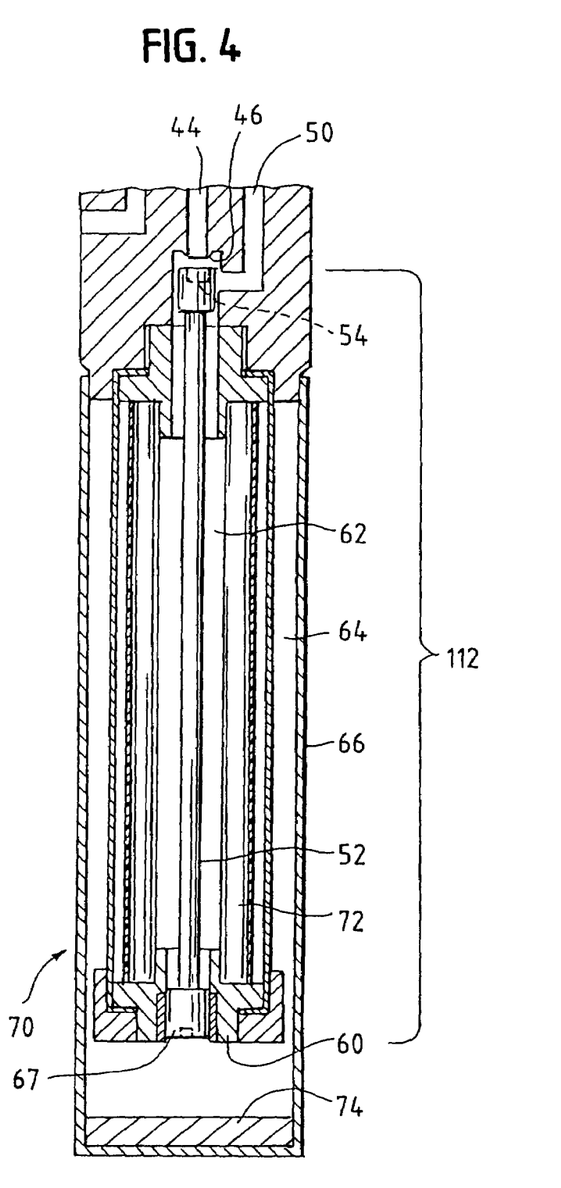
FIG. 4 is an axial section of an absolute pressure regulator according to another embodiment of the present invention.
Figure 5:
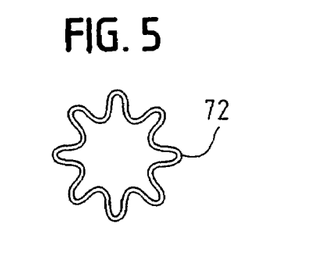
FIG. 5 is a cross-sectional view of the corrugated tube of the absolute pressure regulator of FIG. 4.
Figure 6:
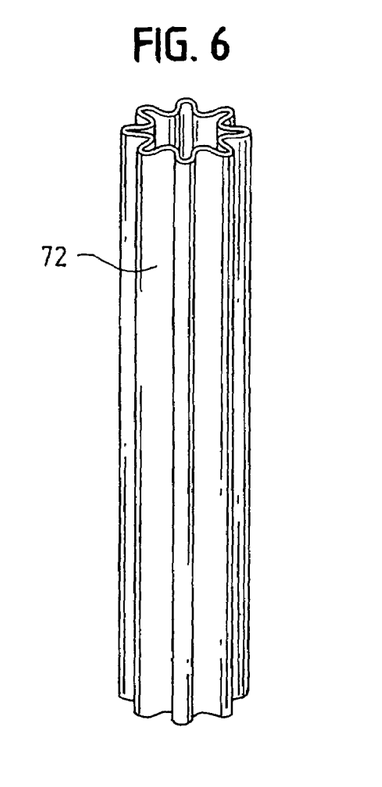
FIG. 6 is a perspective view of the corrugated tube of the absolute pressure regulator of FIG. 4.

FIG. 4 shows an absolute pressure regulator 70 according to another embodiment of the present invention. The absolute pressure regulator 70 includes an expandable membrane that is an expandable longitudinally corrugated tube 72 formed of metal (although other material can instead be used). Instead of using the expandable membrane 56 (a flexible diaphragm) and the stiffening members 68, as shown in FIGS. 1 and 2, the absolute pressure regulator 70 of this embodiment utilizes the corrugated tube 72 to perform a similar function. One end of the corrugated tube 72 is connected to the main body 18, while another end of the corrugated tube 72 is connected to the movable plate 60. The corrugated tube 72 expands radially and contracts axially when fluid exerts pressure on the interior walls of the corrugated tube 72, and contracts radially and expands axially when fluid exerts a greater pressure on the exterior of the corrugated tube 72 as compared to the pressure within the corrugated tube 72. Thus, the axial expansion of the corrugated tube 72 causes the poppet 48 to contact the valve seat 46 in a similar fashion as the expandable membrane 56 and the stiffening members 68 (as shown in FIG. 1–3) act to cause the poppet 48 to contact the valve seat 46. Also, similar to the expandable membrane 56 and the stiffening members 68 of FIGS. 1–3, the contraction of the corrugated tube 72 causes the poppet 48 to recede from the valve seat 46.

Because in this embodiment the pressure regulator 70 is an absolute pressure regulator, no vent to atmosphere is used. Instead, a getter 74 is used to maintain a vacuum condition within the outer cavity 64 by removing traces of gas within the outer cavity 64. The getter 74 is a reactive substance, such as zirconium or calcium, which is incorporated into the absolute pressure regulator 70 to absorb residual gases and moisture. A sealed off vacuum space, such as the interior of the absolute pressure regulator 70, may have a small amount of getter 74 to maintain a low-pressure within that space. Without the getter 74, the interior of the absolute pressure regulator 70 would increase in pressure as absorbed moisture and other gases are released from the interior walls of the absolute pressure regulator 70.

Figure 7:
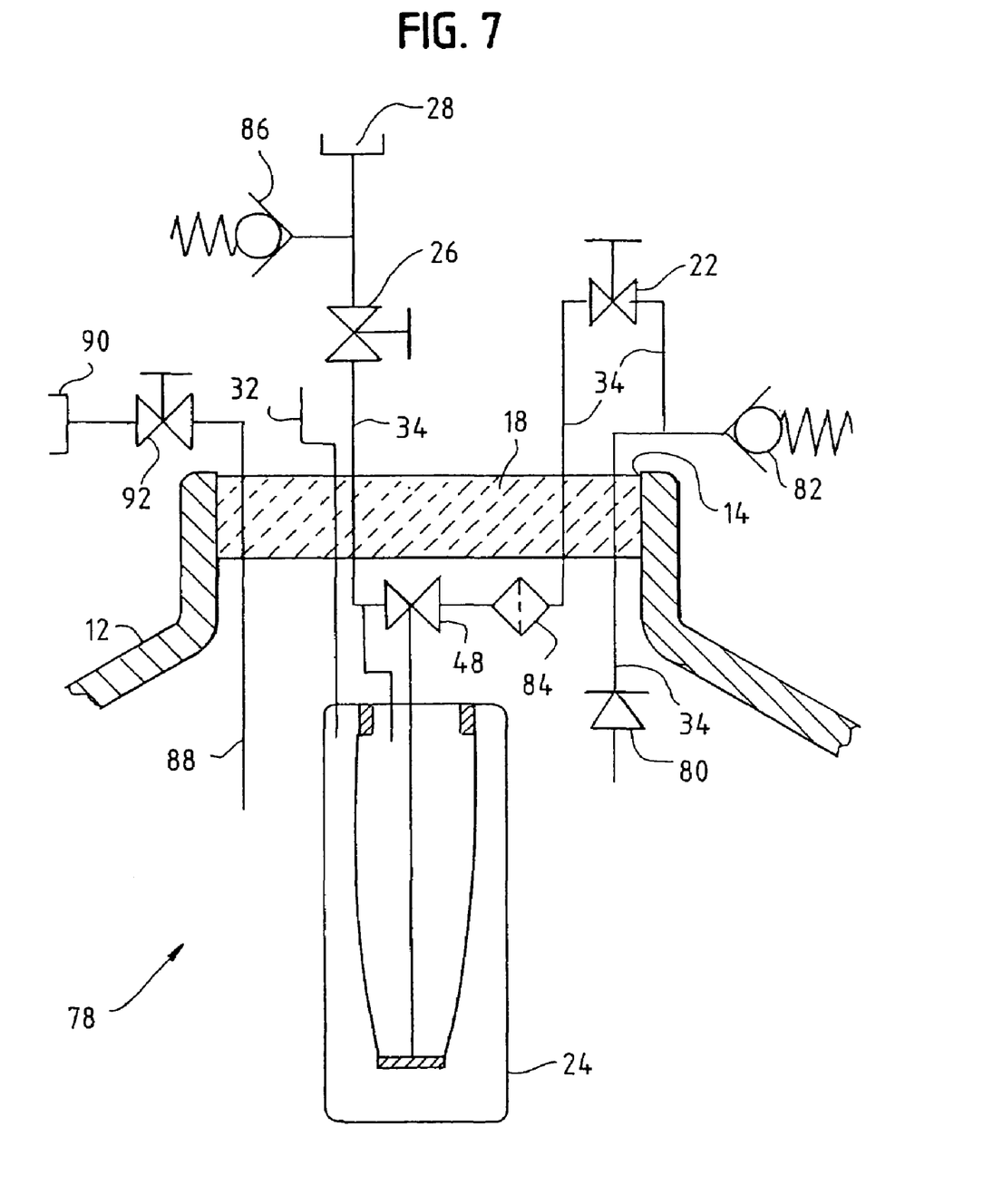
FIG. 7 is a schematic representation of a fluid control system according to an embodiment of the present invention.

FIG. 7 is a schematic representation of a fluid control system 78 according to an embodiment of the present invention. The fluid control system 78 includes a fluid cylinder 12 having an outlet port 14 and a tubular pressure regulator 24 positioned inside the cylinder 12. The pressure regulator 24 includes a poppet 48. The system 78 also includes a residual pressure valve 80, a fluid flow path 34, a high-pressure relief valve 82, a high-pressure shut off valve 22, a filter 84, a low-pressure shut-off valve 26, a low-pressure relief valve 86 and a fluid outlet 28. The system 78 also includes a vent 32. If, however, the pressure regulator 24 is an absolute pressure regulator, the vent 32 is not included within the system 78. Additionally, this embodiment includes a fluid fill path 88, a fluid fill port 90 and fluid fill valve 92. The valve body 18 plugs the outlet port 14 of the cylinder 12.

In operation, fluid is supplied to the cylinder 12 through the fluid fill path 88. That is, an external fluid supply is connected to the fluid fill port 90, so fluid passes from the supply into the fluid fill path 88. The fluid fill valve 92 selectively opens and closes the fluid fill path 88.

Fluid to be dispensed from the cylinder 12 enters the residual pressure valve 80 and passes to the high-pressure shut-off valve 22 via the fluid flow path 34. When the high-pressure shut-off valve 22 is open, fluid then travels downstream from the high-pressure shut-off valve 22 through the filter 84 and to the poppet 48 of the pressure regulator 24. The pressure of the fluid passing through the poppet 48 is reduced by operation of the pressure regulator 24, as described with respect to FIG. 1. Most of the fluid passed by the poppet 48 passes through the fluid flow path 34 to the low-pressure shut-off valve 26. When the low-pressure shut-off valve 26 is opened, the fluid is dispensed through the fluid outlet 28.

The tubular pressure regulator 24 may be set to deliver fluid at a subatmospheric, atmospheric, or superatmospheric pressure, depending on the set point of the pressure regulator 24. If the pressure regulator 24 is set to deliver fluid at subatmospheric pressure, the ambient pressure of the atmosphere ensures that fluid does not pass through the fluid outlet 28 when the outlet is not connected to an external device. That is, the pressure of the atmosphere may exert enough pressure on the fluid to keep it within the system 78.

It will be understood that the present invention lends itself to many alternative embodiments within the scope of one or more claims. For example, inflation pressure could be communicated between the outlet 50 and the outer fluid cavity 64, and the inner fluid cavity 62 could be vented to the atmosphere. This would reverse the action of the poppet 48 responsive to pressure changes. The orientation of the valve disk 54 and seat 46 could also be reversed so the disk 54 would seat by moving downward on the seat 46. These modifications would provide a regulator 24 that works in essentially the same way as the illustrated embodiments.

As another example of a contemplated modification, the stiffening members 56 could be normally bowed inward, so inflation of the inner fluid cavity 62 straightens the stiffening members 56 and moves the end plate 60 axially downward. This modification would again reverse the influence of pressure changes on the poppet 48. Either of the two compensating changes described in the previous example could be employed as well, so the valve disk 54 would still close on the seat 46 responsive to pressure in the regulator outlet 50 reaching the setpoint pressure.

As yet another example of a contemplated modification, movement of the side walls of the cylindrical expandable membrane 56 could be directly transmitted to the poppet 48 by a mechanical linkage within the inner fluid cavity 62. One example of such a mechanical linkage would be a parallelogram linkage having one pair of opposed pivots pulled apart by inflation of the cylindrical expandable membrane 56, thus pushing together the remaining two, axially spaced pivots of the parallelogram. One of the two axially spaced pivots could be linked to the poppet 48 and the other of the two axially spaced pivots could be free floating, or linked to the movable plate 60, or linked to the fixed inlet end 58. Instead of a free floating link, the floating pivot and the two adjacent links could be omitted, leaving a pair of links that function as described above in this paragraph. By selecting one or the other of the axially spaced links to connect to the poppet 48, the poppet 48 would either be raised or lowered by inflation of the inner fluid cavity 62. A compound lever linkage could also be employed to provide a mechanical advantage.

Still another example of a contemplated modification would be to fix the movable plate 60 relative to the housing 66, fix the poppet 48 relative to the inlet end 58, and mount the inlet end 58 to be axially movable. One of the previously described expedients, such as reversing the valve and valve seat, or arranging the mechanism so inflation would straighten the stiffening members 56 instead of bending them, could again be used to complete the modification.

Additionally, pressure gauges may be added within the system. An active high pressure gauge, which may communicate directly with the cylinder, may be used within the system. A passive high pressure gauge, which may communicate with the fluid flow path 34 between the high pressure shut-off valve 22 and the regulator 24, may also be used. Also, a low pressure gauge may be included within the fluid flow path 34, downstream of the regulator 24. The gauges may be mechanical display gauges, such as Bourdon tube gauges, or may be electronic gauges, which provide an electrical output.

Many other modifications and combinations of the above modifications will readily occur to those skilled in the art, upon further contemplation of this specification.

Figure 8:
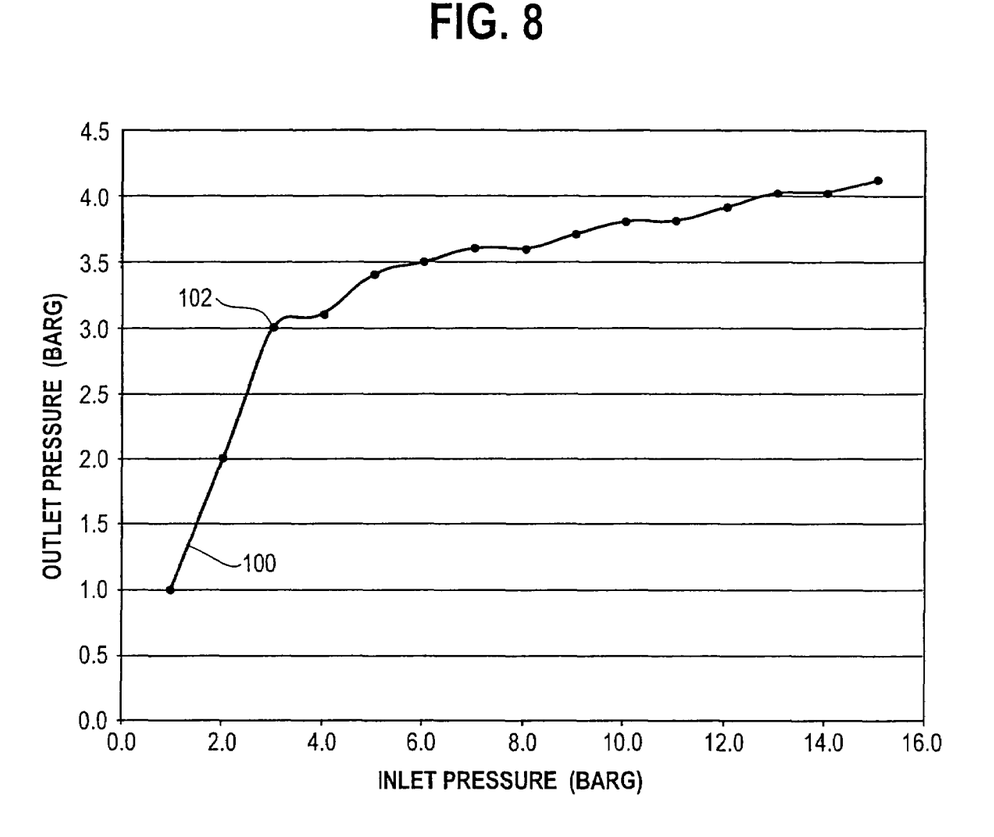
FIG. 8 is a graph showing the relationship between inlet pressure and outlet pressure of the pressure regulator.

FIG. 8 is a graph showing the relationship between inlet pressure and outlet pressure of the pressure regulator. The flow rate is approximately 20 liters per minute. The plot 100 shows the relationship between inlet pressure (measured in Barg—Bars, gauge pressure), shown on the X-axis, and outlet pressure (measured in Barg), shown on the Y-axis. The plot 100 shows that the pressure regulator yields a relatively constant pressure outlet for varying inlet pressure at a relatively high flow rate. As shown by reference line 102, at approximately 3 Barg of inlet pressure, the pressure regulator begins to close. Also, as shown by graph 100, even at 14 Barg of inlet pressure, the outlet pressure is less than 4.5 Barg.

Thus, embodiments of the present invention provide a pressure regulator having a small radial dimension. The regulator can be made small enough to fit within a standard fluid cylinder having an opening of ¾ inch NGT. In one embodiment of the invention, the regulator can be placed within a standard fluid cylinder to protect the regulator from damage. The embodiments shown and described offer increased safety for users of gases, such as hydrides used in semiconductor manufacturing processes, stored at high pressures within fluid cylinders. Embodiments of the present invention offer a compact and robust package for use in, for example, semiconductor manufacturing. Also, the embodiments of the present invention may also be used with welding gases and oxygen dispensing devices used in the medical field, with scuba-diving gas cylinders, or with any gas dispensing apparatus for any use.

While particular elements, embodiments and applications of the present invention have been shown and described, it will be understood, of course, that the invention is not limited thereto since modifications may be made by those skilled in the art, particularly in light of the foregoing teachings.

The invention claimed is:

1. A fluid control system for dispensing high-pressure fluid at reduced pressure, said system comprising:
 a container for storage and dispensing of a fluid, said container having an outlet; and
 a fluid flow control device connected to said outlet of said container, said fluid flow control device comprising:
 at least a first fluid flow path having a main fluid inlet in fluid communication with said container and a main fluid outlet;
 a high-pressure shut-off valve in said first fluid flow path to selectively open or close said fluid flow path; and
 a fluid pressure regulator in said first fluid flow path for providing fluid at said main fluid outlet at a selected pressure, said fluid pressure regulator being of a generally tubular configuration having a fixed inlet end and a moveable closed end, said fluid pressure regulator being downstream of said high-pressure shut-off valve and being located inside said container, said fluid pressure regulator comprising:
 a fluid inlet;
 a fluid outlet;
 a first fluid flow path between said fluid inlet and said fluid outlet;
 a valve seat positioned in said first fluid flow path and dividing said fluid inlet and said fluid outlet;
 a valve element regulating flow through said valve seat;
 a longitudinally corrugated metal tube defining an inflatable fluid cavity that contracts axially, responsive to inflation;
 a wall portion of said cavity that moves responsive to inflation and deflation of said cavity;
 a second fluid flow oath communicating between said cavity and a source of pressure outside said cavity; and
 a link transmitting the movement of said wall portion to said valve element, thereby moving said valve element with respect to said valve seat responsive to inflation and deflation of said cavity.

2. The fluid pressure regulator of claim 1, further comprising a rigid housing, wherein said rigid housing isolates said generally cylindrical membrane from the fluid within said container.

3. The fluid pressure regulator of claim 1, further comprising a low-pressure shut-off valve positioned downstream of said fluid pressure regulator in said fluid flow path, wherein said low-pressure shut-off valve selectively opens said fluid flow path.

4. The system of claim 1, wherein said container is a standard fluid cylinder having a cylinder inlet of ¾ inch NGT.

5. The system of claim 1, wherein said fluid is provided at said main fluid outlet at a subatmospheric pressure.

6. The system of claim 1, wherein said fluid is provided at said main fluid outlet at atmospheric pressure.

7. The system of claim 1, wherein said fluid is provided at said fluid outlet at a superatmospheric pressure.

8. The system of claim 1 used within a semiconductor manufacturing process.

9. The system of claim 1, wherein said container contains at least one of toxic and corrosive gas.

* * * * *